United States Patent
Kersey et al.

(12) 
(10) Patent No.: US 6,496,325 B1
(45) Date of Patent: Dec. 17, 2002

(54) MEDIA HANDLING SYSTEM AND METHOD

(75) Inventors: Kevin T. Kersey, San Diego, CA (US); Jon Drechny, San Diego, CA (US)

(73) Assignee: Overland Storage, Inc., San Diego, CA (US)

( * ) Notice: Subject to any disclaimer, the term of this patent is extended or adjusted under 35 U.S.C. 154(b) by 48 days.

(21) Appl. No.: 09/712,386

(22) Filed: Nov. 13, 2000

(51) Int. Cl.⁷ .............................................. G11B 15/68
(52) U.S. Cl. ....................................................... 360/92
(58) Field of Search ........................... 360/92; 369/178, 369/36, 34

(56) References Cited

U.S. PATENT DOCUMENTS

| | | | | |
|---|---|---|---|---|
| 4,314,293 A | * | 2/1982 | Paulson ........................ | 360/92 |
| 4,668,150 A | * | 5/1987 | Blumberg ..................... | 360/92 |
| 4,742,405 A | * | 5/1988 | Teranishi ...................... | 360/92 |
| 4,779,151 A | * | 10/1988 | Lind et al. .................... | 360/92 |
| 4,839,758 A | * | 6/1989 | Honjoh ......................... | 360/92 |
| 5,277,534 A | * | 1/1994 | Anderson et al. ............. | 360/92 |
| 5,285,333 A | | 2/1994 | Barr et al. | |
| 5,353,179 A | * | 10/1994 | Elliott et al. .................. | 360/92 |
| 5,515,356 A | * | 5/1996 | Lee .............................. | 360/92 |
| 5,781,367 A | * | 7/1998 | Searle et al. .................. | 360/92 |
| 5,870,245 A | | 2/1999 | Kersey et al. | |
| 5,975,450 A | * | 11/1999 | Leger et al. ................. | 242/337 |
| 6,094,321 A | * | 7/2000 | Pollard ........................ | 360/92 |
| 6,155,766 A | * | 12/2000 | Ostwald et al. ............... | 360/92 |
| 6,160,677 A | * | 12/2000 | Chiba .......................... | 360/92 |
| 6,327,113 B1 | * | 12/2001 | Mueller et al. ............... | 360/92 |

* cited by examiner

*Primary Examiner*—Allen Cao
(74) *Attorney, Agent, or Firm*—Knobbe, Martens, Olson & Bear

(57) ABSTRACT

A media element library includes two linear arrays of media elements. Positioned between the two media element arrays is a linearly extending track on which a media element transfer carriage is mounted. The track is split into two segments, with one of the segments being rotatable. The rotatable segment pivots through 180 degrees so that the media element transfer carriage can access both arrays of media elements as well as tape drives provided within the library.

16 Claims, 11 Drawing Sheets

MEDIA HANDLING SYSTEM AND METHOD

BACKGROUND OF THE INVENTION

1. Field of the Invention

The invention relates to media element libraries for data storage.

2. Description of the Related Art

Magnetic tape cartridges, magnetic disks, and optical disks are all widely used as peripheral memory storage devices for computer systems. Large computer systems often operate in conjunction with external libraries of dozens of media elements as well as the media element readers used to record and retrieve the data. Although originally such media elements were selected and loaded manually, automated libraries were developed to expedite the handling of the media elements. These systems include robotics for accessing and retrieving media elements from storage locations, and loading the retrieved media element into an appropriate reader.

Some embodiments of such libraries comprise a small number of magnetic tape cartridges, six or ten being typical, and one or two tape drives housed in a single enclosure. Some systems have also been developed which comprise several smaller modules coupled together in a single rack. A system of this type is described in U.S. Pat. No. 5,870,245 to Kersey et al. The disclosure of U.S. Pat. No. 5,870,245 is hereby incorporated by reference in its entirety.

As data storage requirements for computer systems have increased, the volumetric efficiency of a library, that is, the number of media elements that can be stored per unit volume of the apparatus, has become an important factor in media library design. Maximizing volumetric efficiency requires careful consideration of the arrangement of media elements within the library, as well as the robotic system that retrieves and transports the media elements. Libraries that store media elements in a rotating circular carousel generally need a relatively small volume for media element transport robotics because the rotating carousel allows access to all of the media elements from one stationary position at any one point along the circumference of the carousel. However, the packing density of rectangular media elements such as tape cartridges is limited in a circular arrangement. One embodiment of a library with a carousel media element storage configuration is illustrated in U.S. Pat. No. 5,285,333 to Barr et al.

Alternatively, media elements may be stored as linear arrays of adjacent media elements. Storing media elements in linear arrays results in a high media element packing density, but requires more room for transport robotics because the transport robotics needs to travel up and down along the array to retrieve selected media elements. An example of this type of system is provided in the Kersey, et al. patent mentioned above. In addition, if more than one linear array is provided, more complex and expensive robotic transport robotics are needed to access all of them. It would therefore be beneficial to produce media element libraries with a high density of media elements as well as relatively simple and inexpensive robotic transport systems.

SUMMARY OF THE INVENTION

In one embodiment, the invention includes a robotic media handling system comprising first and second linear track segments, wherein one of the segments is pivotably mounted on an axis of rotation. A media element transfer carriage comprising a storage location for at least one media element is movably mounted to one of the track segments.

DETAILED DESCRIPTION OF THE PREFERRED EMBODIMENT

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1:
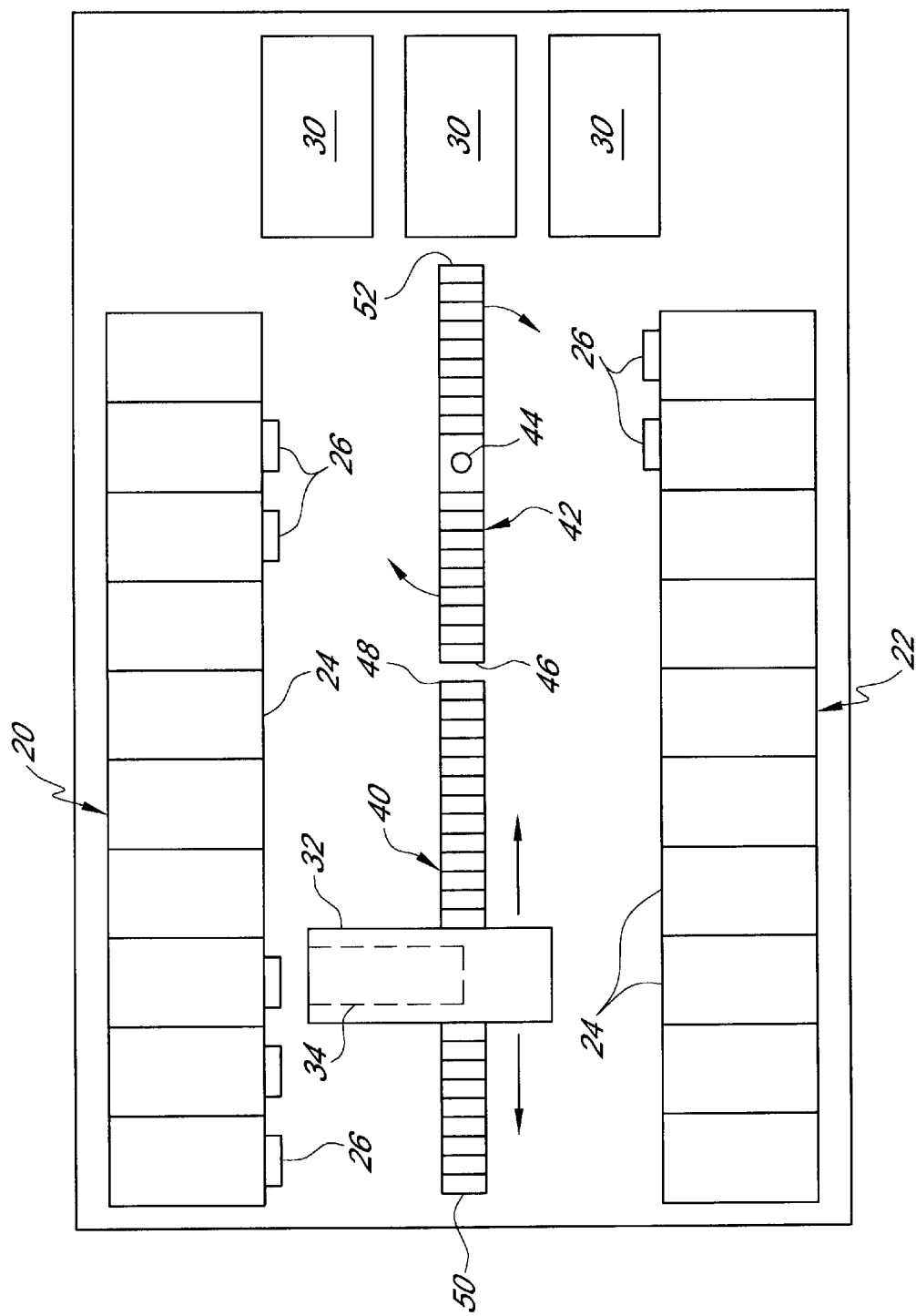
FIG. 1 is a top plan view of a media element library with a rotating carriage track segment in accordance with one embodiment of the invention.

Referring now to FIG. 1, a top plan view of a media element library is illustrated. In the specific embodiment described below, the media elements are magnetic tape cartridges, although it will be appreciated that the invention is applicable to libraries containing other types of media elements as well. The library includes two tape cartridge magazines 20, 22, each of which comprises a linear array of adjacent tape cartridge storage locations 24., at least some of which contain a tape cartridge. Each individual magazine may, for example, have a configuration similar to the tape cartridge magazines described in the Kersey et al. patent mentioned above. As illustrated in this Figure, the magazines may be oriented such that the openings of the storage locations 24 face each other toward the center of the library enclosure.

The library may also include one or more tape drives 30. In this embodiment, the tape drives are placed in the rear of the library, with their front ends also facing the center of the library and the space between the fronts of the tape cartridge magazines 20, 22. In this embodiment, therefore, the tape drives 30 are oriented in a linear array which is orthogonal to the linear arrays of tape cartridges.

In the space between the magazines 20, 22, a robotic tape cartridge transfer carriage 32, which will be referred to herein as the "shuttle," is provided. The shuttle 32 includes an on-board tape cartridge storage location 34 with a mouth on one side of the shuttle 32. During library operation, the shuttle is positioned adjacent to a media element storage location in one of the magazines 20, 22. The media element in this storage location is loaded into the shuttle 32, and the shuttle ferries the tape cartridge either to another storage location, or to one of the tape drives 30. There are many alternative ways to perform the loading and unloading process between the shuttle 32 and the magazine storage locations 24 and tape drives 30, any of which would be suitable for use in conjunction with the present invention. In one embodiment, a picker mechanism as described in the above mentioned Kersey et al. patent is utilized.

Figure 2:
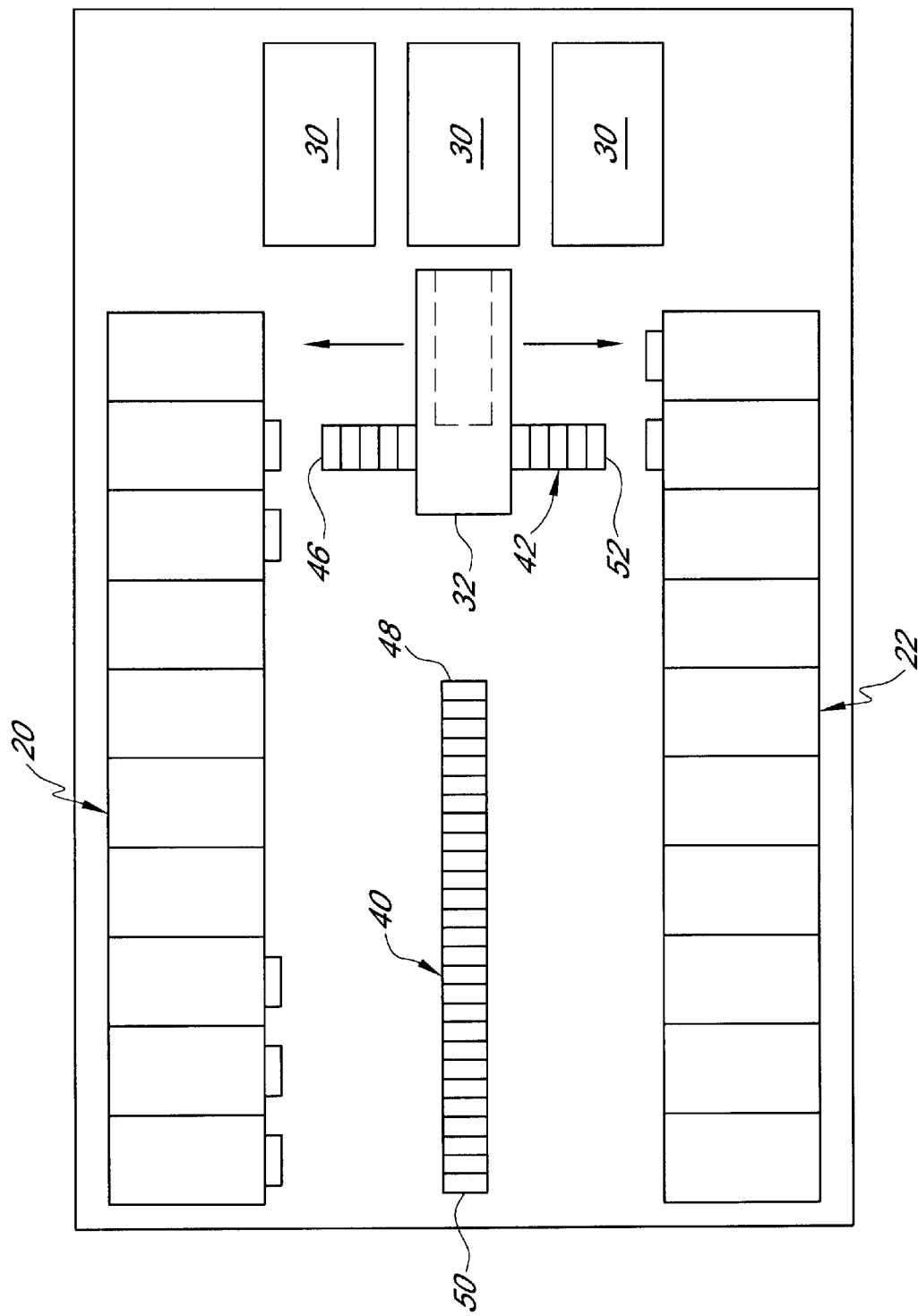
FIG. 2 is a top plan view of the media element library of FIG. 1 with the rotating segment rotated 90 degrees from its position in FIG. 1.
Figure 3:
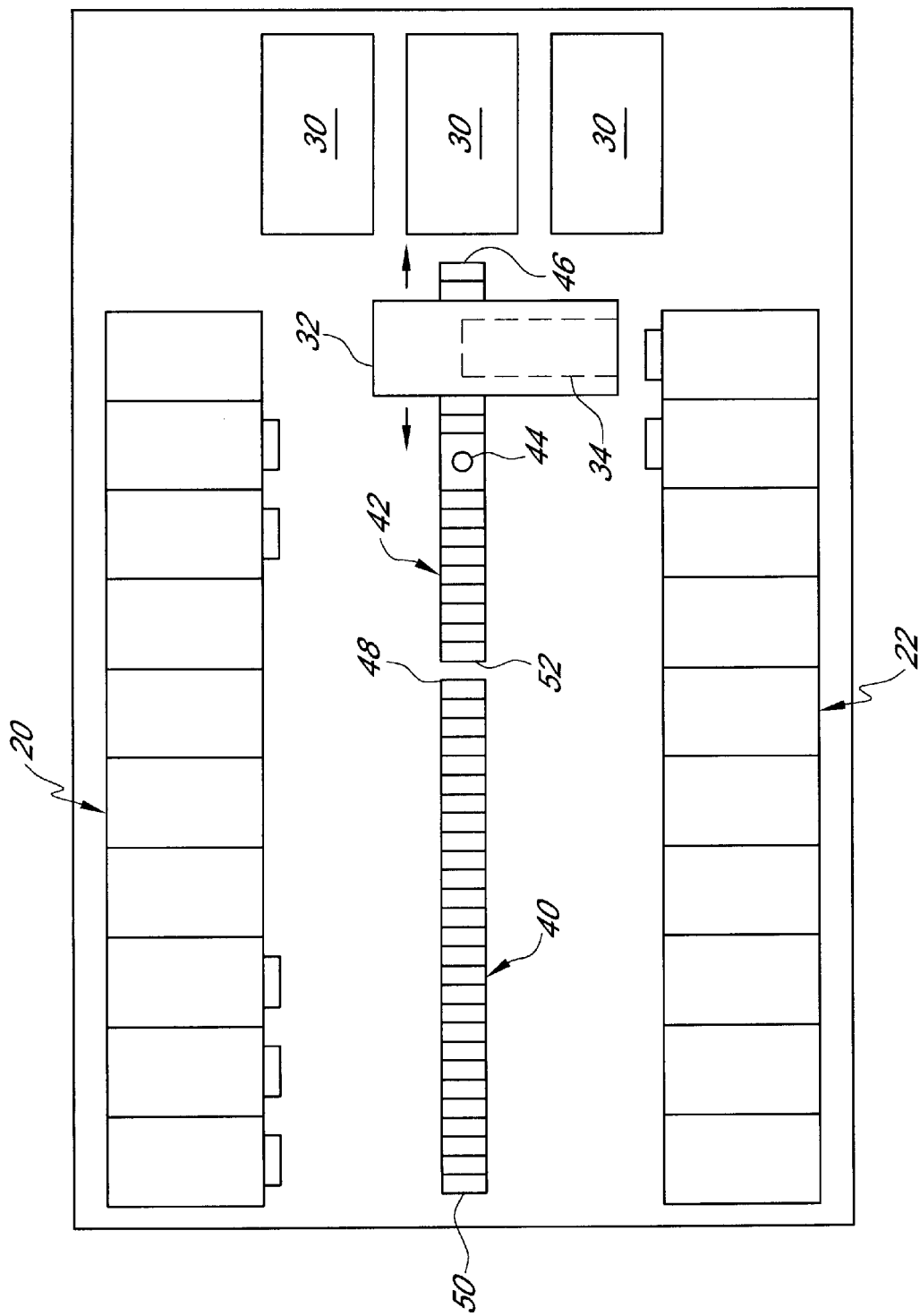
FIG. 3 is a top plan view of the media element library of FIG. 1 with the rotating segment rotated 180 degrees from its position in FIG. 1.

The shuttle is coupled to a toothed linear track which is advantageously split into at least two segments 40, 42. One segment 42 is secured to the floor of the library in a fixed orientation extending along and between the linear tape cartridge magazines 20, 22. Another segment 42 is pivotably mounted to the floor of the library on an axis of rotation 44. As shown in FIGS. 2 and 3, the rotatable segment 42 of the toothed track allows the shuttle to access tape cartridges in both magazines and to access the tape drives 30 without sacrificing a large amount of space within the library for the robotic elements.

In FIG. 1, the mouth of the shuttle tape cartridge storage location 34 is positioned adjacent to the magazine designated with numeral 20, and the rotatable segment 42 of the track is oriented such that a first end 46 thereof is adjacent to a first fixed end 48 of the first segment 40 of the linear track. In this configuration, the shuttle can travel up and down both segments 40, 42 of the linear track from the end 50 of the track that is closest to the front of the library all the way to the opposite end 52 of the track that is closest to the rear of the library, and can thus be positioned along the first magazine 20 so as to access any of the tape cartridge storage locations in this magazine 20.

Referring now to FIG. 2, the shuttle 32 can be reoriented to access the tape drives in the following manner. First, the shuttle 32 is moved down the track so as to be positioned substantially over the axis of rotation 44 of the rotatable track segment 42. This segment 42 is then rotated through about 90 degrees so as to be oriented orthogonal to the first segment 40 and substantially aligned along the front portions of the array of tape drives 30. In this configuration, the shuttle 32 can travel up and down the rotatable track segment 42 in a different direction from the direction defined by the first segment 40 so as to access any selected one of the tape drives 30 and to load and unload tape cartridges therefrom.

Shuttle access to the other magazine 22 is illustrated in FIG. 3. To reach this configuration, the shuttle 32 is again positioned substantially over the axis of rotation 44 of the rotatable track segment 42. The rotatable segment 42 is then rotated another 90 degrees in the same direction until the second end 52 of the rotatable segment is adjacent to the first end 48 of the fixed track segment. In this configuration, the shuttle can again travel up and down both segments 40, 42 of the linear track from the end 50 of the track that is closest to the front of the library all the way to the opposite end 46 of the track that is closest to the rear of the library, and can thus be positioned along the second magazine 22 so as to access any of the tape cartridge storage locations in this magazine 22.

The apparatus as shown in these Figures is advantageous for several reasons. First, with two linear magazines surrounding a robotic transfer apparatus, a volumetric efficiency of nearly ⅔ can be obtained. With the efficient linear cartridge packing, nearly ⅔ of the volume is occupied by cartridges, and about ⅓ is occupied by robotic cartridge handling apparatus. Furthermore, the shuttle rotation required to access both magazines 20, 22 and the tape drives 30 occurs with the shuttle located at an intermediate point along the linear extent of the track. With this design, no rotational clearance for the shuttle 32 needs to be provided at either end of the track, thus allowing the magazines 20, 22 to extend essentially all the way from the front of the library to the tape drives in the rear while still having every tape cartridge storage location accessible to the shuttle 32.

Figure 4:
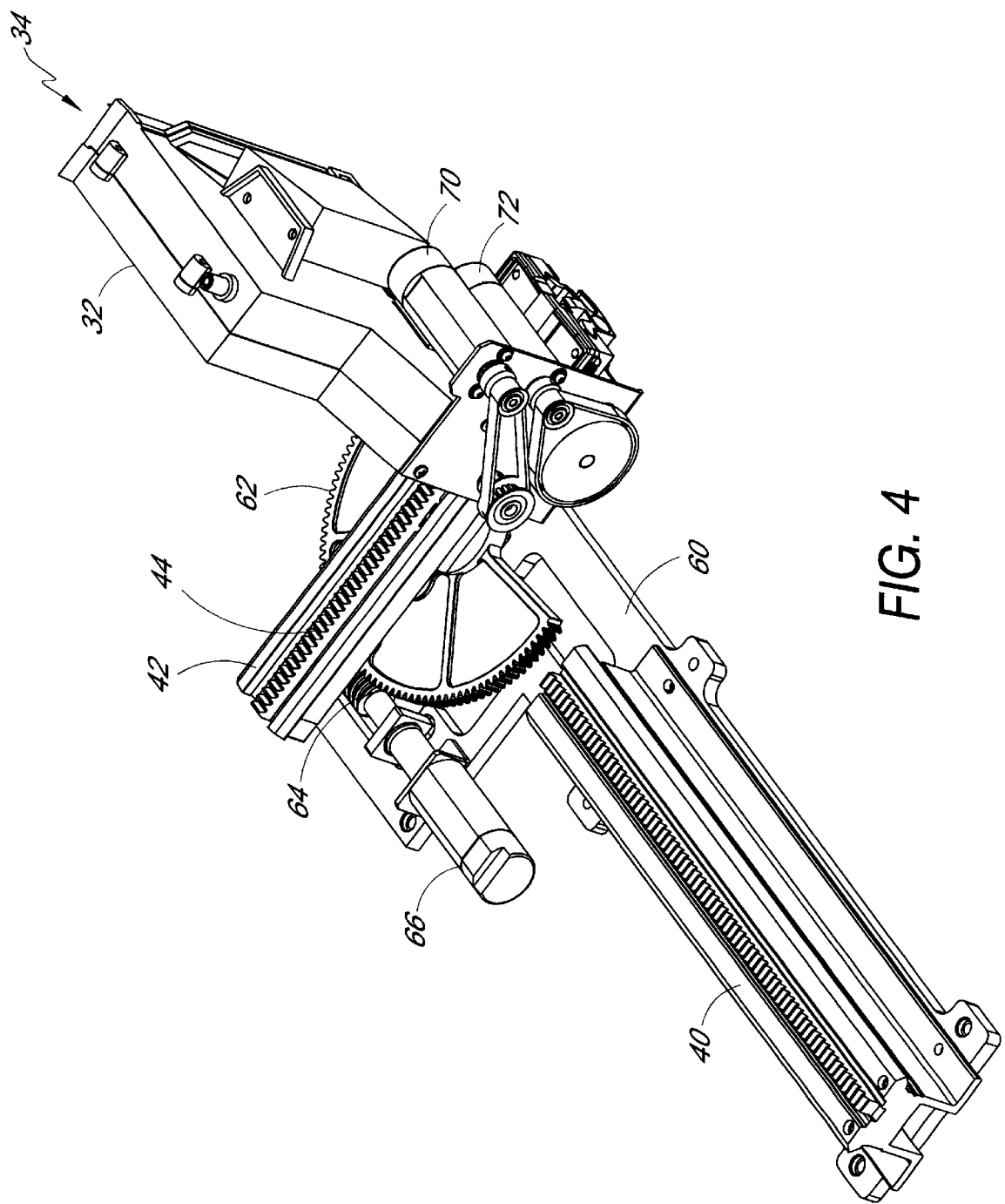
FIG. 4 is a perspective view of a specific media transport robotic system in accordance with one embodiment of the invention.

FIG. 4 is a perspective view of one specific embodiment of a robotic media handling apparatus that is suitable for use in the library illustrated in FIGS. 1, 2, and 3. In this Figure, the configuration of the apparatus is the same as that shown in FIG. 2. In this embodiment, a base plate 60 is configured for mounting to the floor of the library, and itself provides a mounting location for the fixed track segment 40. The rotatable track segment 42 is coupled in a fixed orientation to a toothed wheel 62 which is pivotably mounted to the base plate 60 at the above described axis of rotation 44. The toothed wheel 62 is coupled to a drive gear 64 which is coupled to a bi-directional motor 66. Thus, operation of the motor 66 turns the drive gear 64, which turns the toothed wheel 62 thereby rotating the rotatable track segment 42 to any desired orientation within a 180 degree freedom of angular orientation of the rotatable segment 42. As is also shown in FIG. 4, the shuttle 32 may be mount two additional motors. One of these is a motor 70 which operates a picker or gripper mechanism for loading and unloading tape cartridges into and out of the on-board storage location 34. The other motor 72 is coupled to a gear (not shown) that is engaged to the teeth of the track segments 40, 42 for moving the shuttle 32 along the track. It is an additional advantage of this apparatus that only three motors are required to perform all robotic functions since the same motor 72 is used to perform linear translation of the shuttle in two orthogonal directions depending on the orientation of the rotatable track segment 42.

Figure 5A:
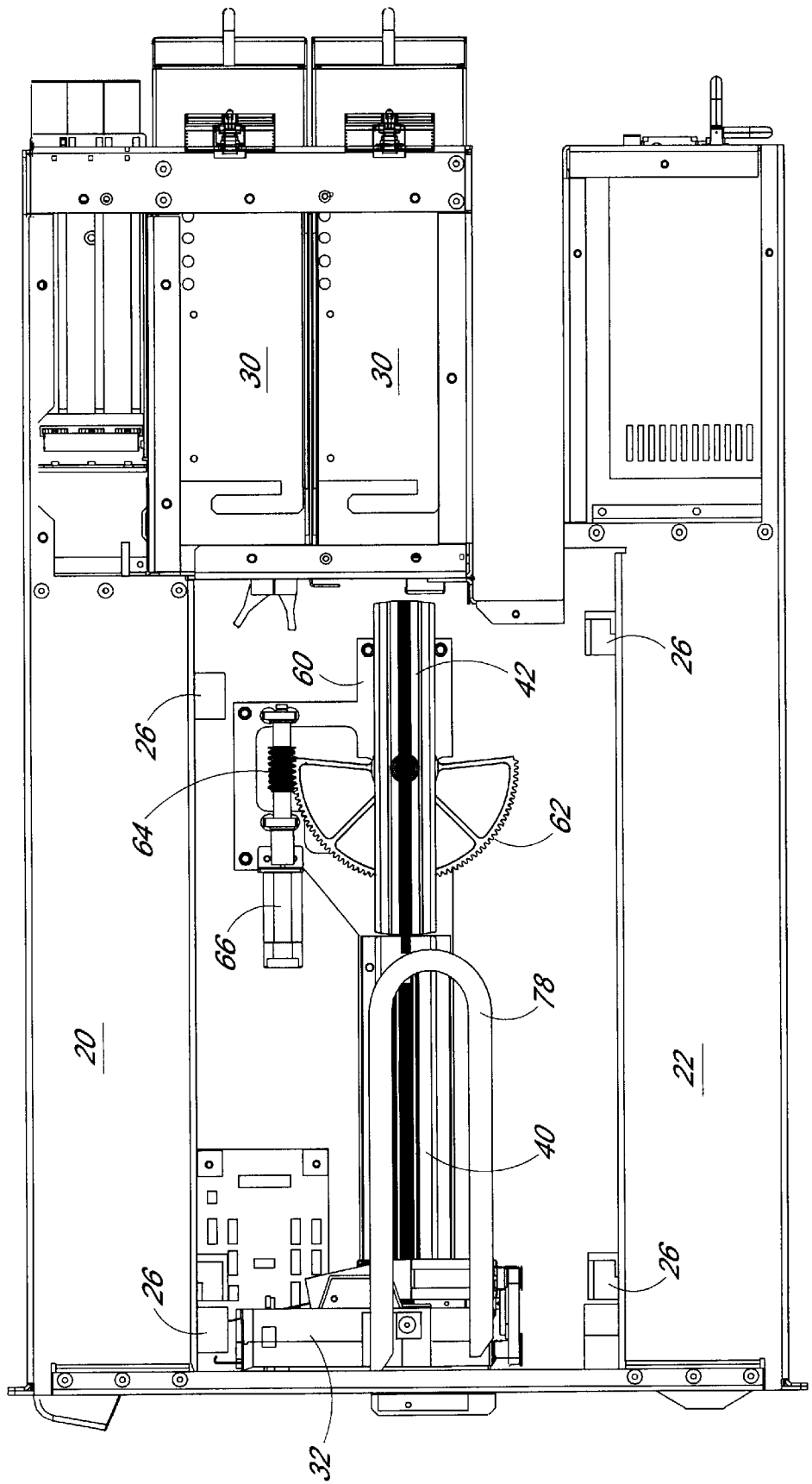
FIG. 5A is a top view of one embodiment of the invention with the transport carriage positioned at a first media element storage location of a first media element magazine.

FIGS. 5A through 6C illustrate the media handling apparatus of FIG. 4 installed in a specific embodiment of a tape cartridge library. In FIG. 5A the rotatable track segment 42 is linearly aligned with the fixed track segment 40, and the mouth of the shuttle 42 is oriented to face the first media element magazine 20. In this Figure, the shuttle 32 is positioned near the track end that is proximate to the front of the library for accessing the forwardmost tape cartridge 26 of the first magazine 20. Also shown in FIG. 5A is a hollow cable chain 78, within which power and signal wiring are routed from stationary driver circuitry to the moving carriage. Such chains are well known in the art and are commercially available from, for example Igus. This aspect of the system is described in additional detail below with reference to FIG. 6A.

Figure 5B:
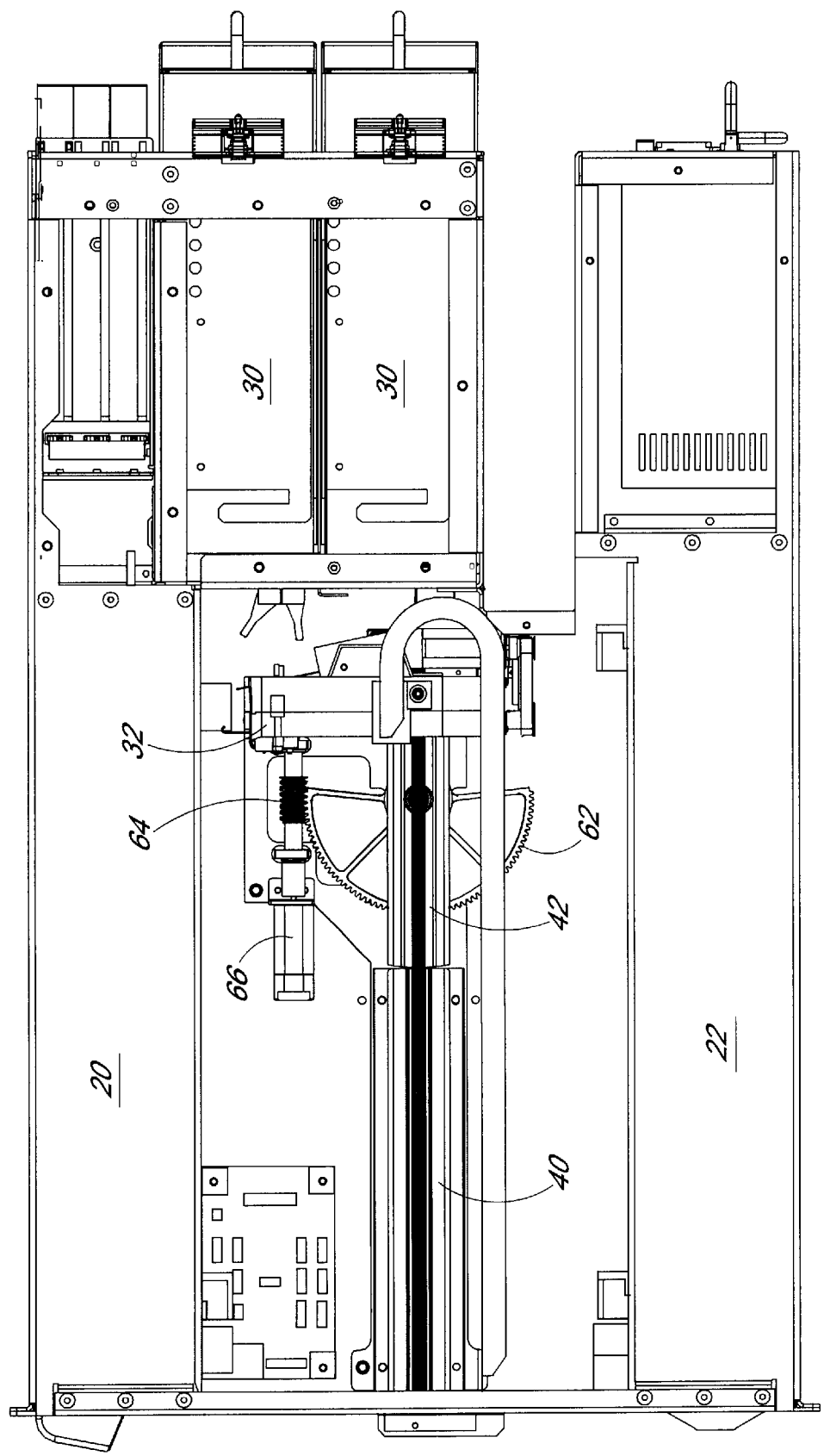
FIG. 5B is a top view of one embodiment of the invention with the transport carriage positioned at a last media element storage location of a first media element magazine.

FIG. 5B is similar to FIG. 5A, except that the shuttle 32 has been moved linearly rearward within the library to now reside on the second track segment 42 and in position to access the rearmost tape cartridge 26 of the first magazine 20.

Figure 5C:
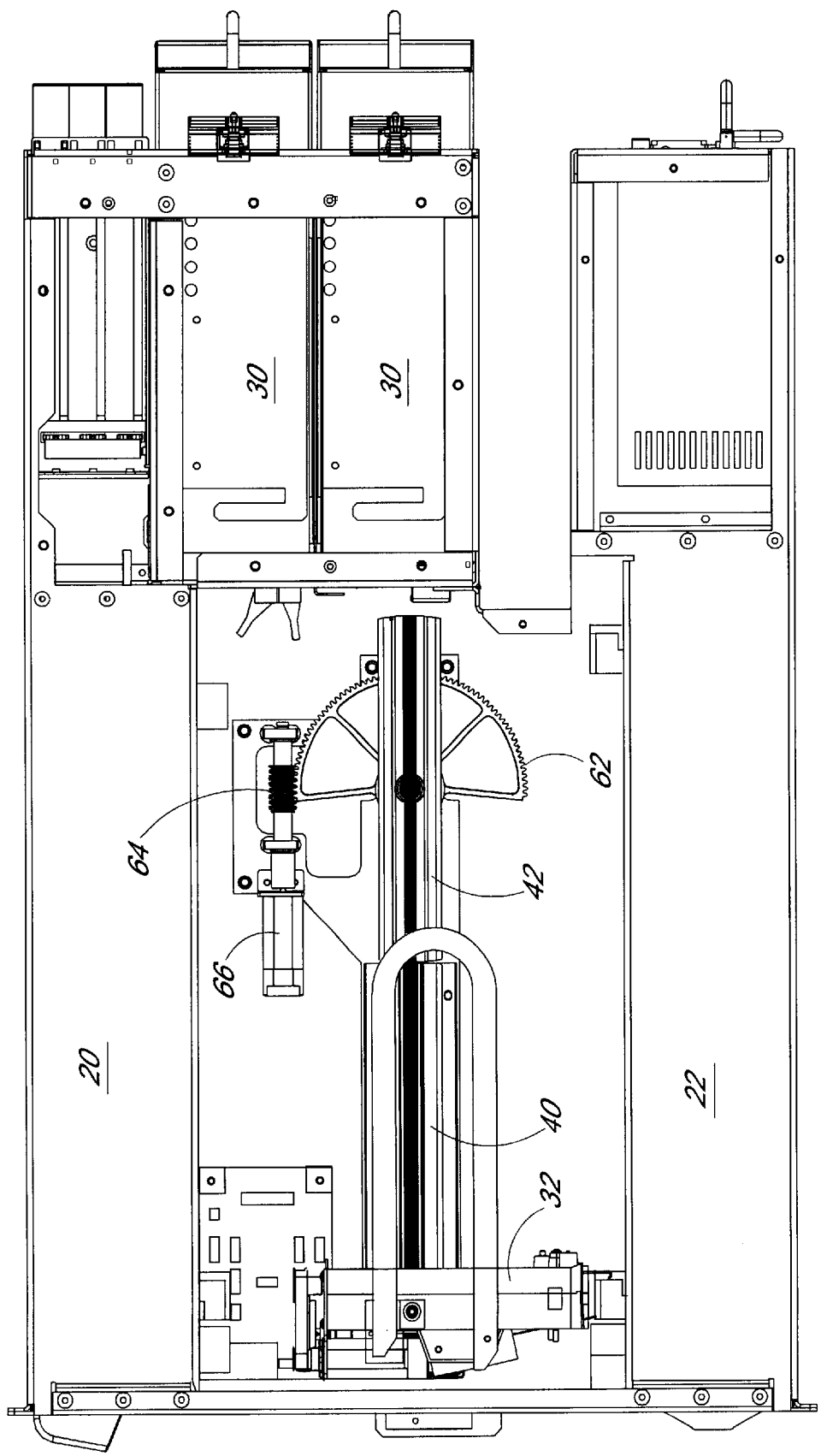
FIG. 5C is a top view of one embodiment of the invention with the rotatable track rotated 180 degrees from its position in FIGS. 4A and 4B, and the transport carriage positioned at a first media element storage location of a second media element magazine.

FIG. 5C illustrates the shuttle 32 rotated 180 degrees from the orientation of FIG. 5A so as to face the second tape cartridge magazine 22. As in FIG. 5A, the shuttle is positioned near the front of the library so as to access the forwardmost tape cartridge in the second magazine 22. To reach this position from the position shown in FIG. 5A, the shuttle was moved to be over the axis of rotation 44 of the rotatable track segment 42. The toothed wheel 62 was rotated clockwise 180 degrees with the drive motor 66 so that the opposite end of the rotatable track segment 42 was aligned with the end of the fixed track segment 40 and the shuttle 32 was facing the opposite direction. The shuttle was then moved linearly forward along the track back to the front of the library.

Figure 5D:
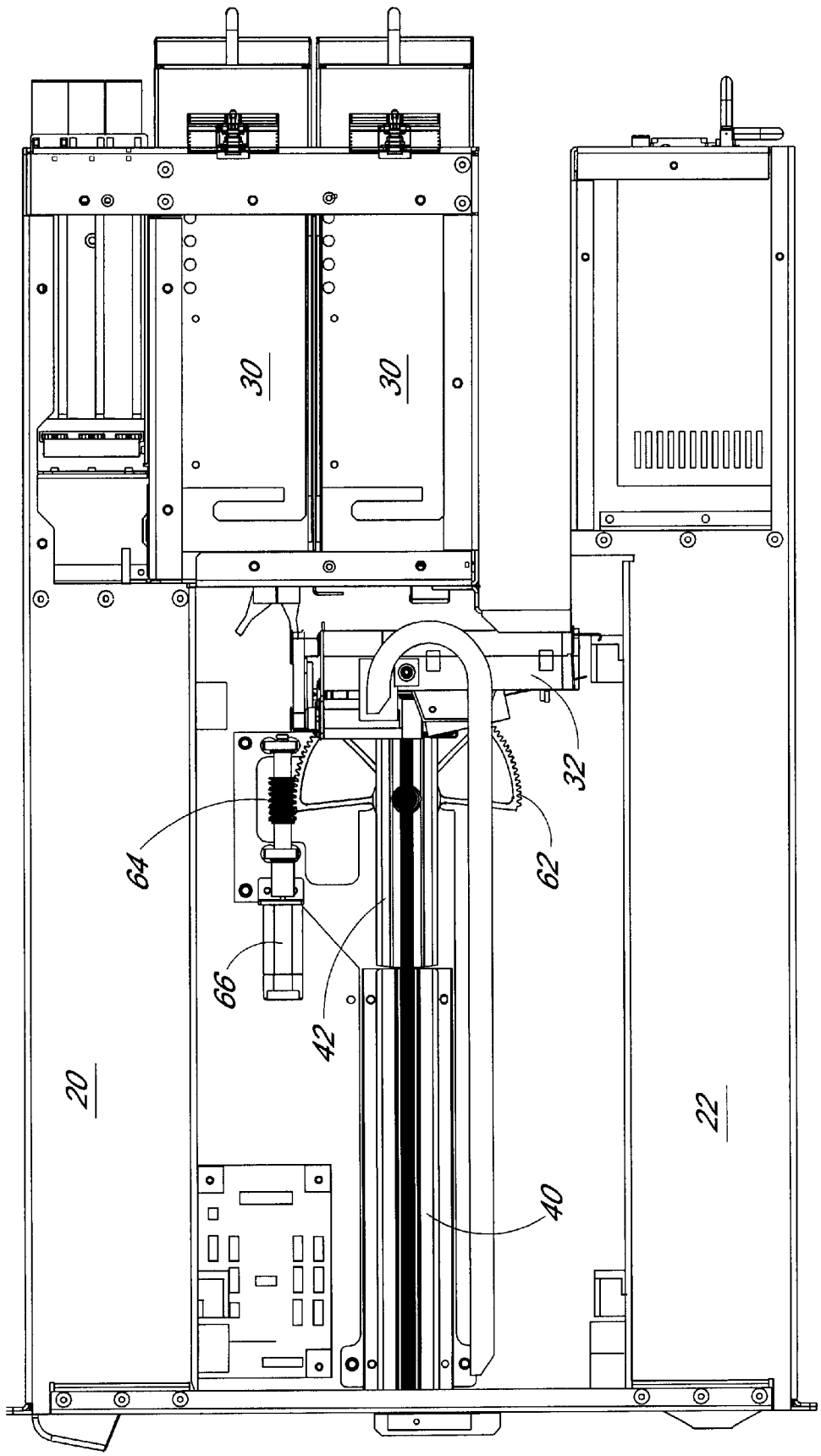
FIG. 5D is a top view of one embodiment of the invention with the rotatable track rotated 180 degrees from its position in FIGS. 4A and 4B, and transport carriage positioned at a last media element storage location of a second media element magazine.

FIG. 5D is similar to FIG. 5A, except the shuttle 32 has been moved linearly rearward within the library to now reside on the second track segment 42 and in position to access the rearmost tape cartridge 26 of the second magazine 22.

Figure 6A:
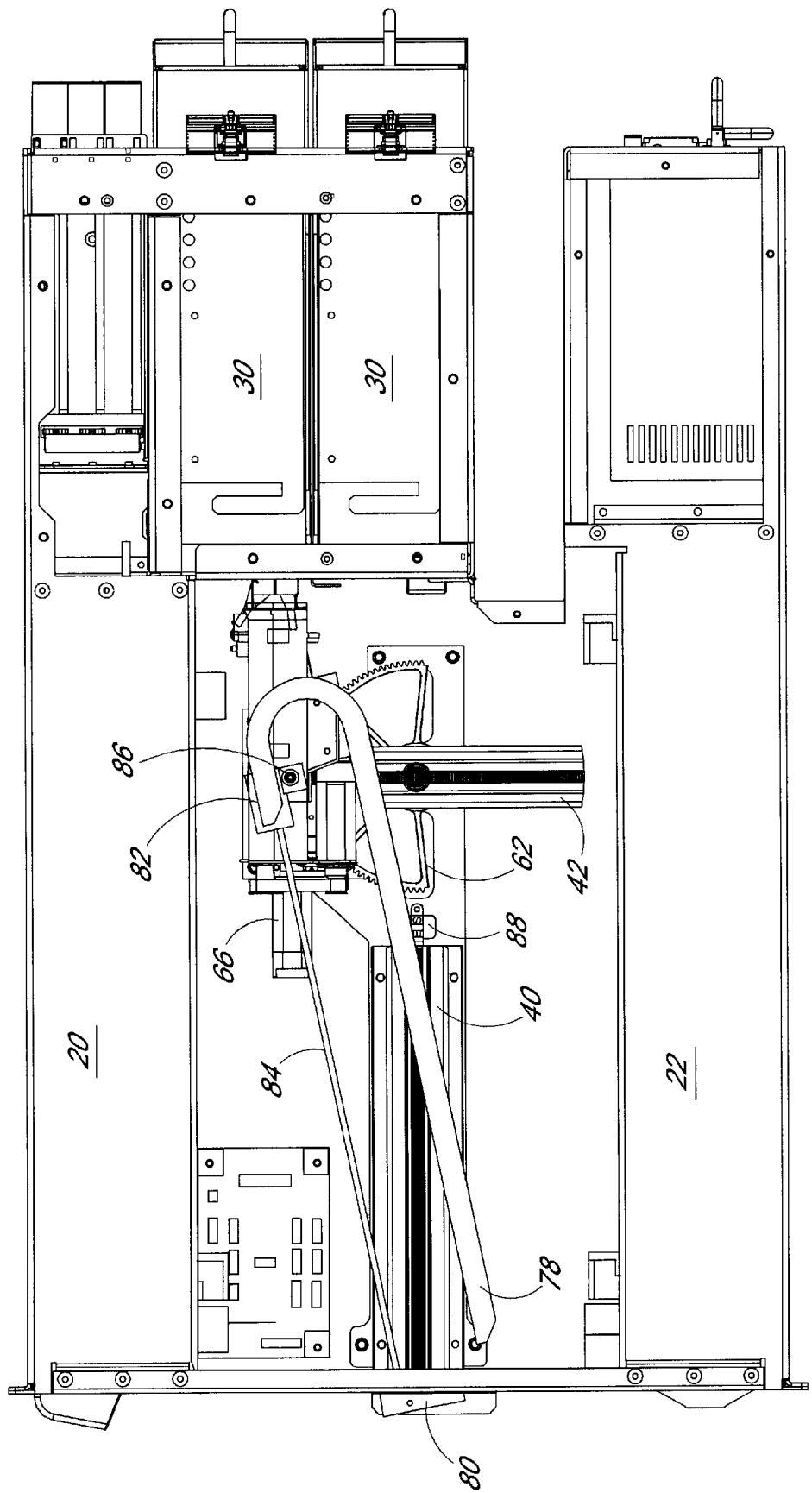
FIG. 6A is a top view of the embodiment of FIG. 4 with the rotatable track segment rotated 90 degrees from its position in FIGS. 4A and 4B, and with the transport carriage positioned to insert a media element into a first media element reader.

FIG. 6A illustrates the apparatus with the rotatable track segment 42 oriented orthogonal to the fixed track segment 40, and with the shuttle 32 positioned to access the leftmost tape drive 30. In this Figure, one advantageous power and signal wiring scheme is best illustrated. Because the shuttle moves in two orthogonal directions and also rotates 180 degrees, care should be taken with the routing of electrical power and signals from stationary driver and control circuitry in the library to the moving shuttle 32. Although sliding brushes and/or infrared or other wireless transmission are possible solutions, these have disadvantages from both a reliability and manufacturing expense point of view.

In the embodiment of FIGS. 5A through 6C, electrical power and signal wiring is routed to the shuttle within a bendable conduit 78 commonly called an Igus chain that has one end attached to one side of a bracket 80 on the front panel and the other end attached to a bracket 82 on the shuttle 32. The bracket 80 is pivotably mounted to the front panel, and the bracket 82 is also pivotably mounted to the top of the shuttle 32. Furthermore, a rod 84 is attached to the other side of the front panel bracket 80, and extends out to and through a channel in the shuttle bracket 82.

Figure 6B:
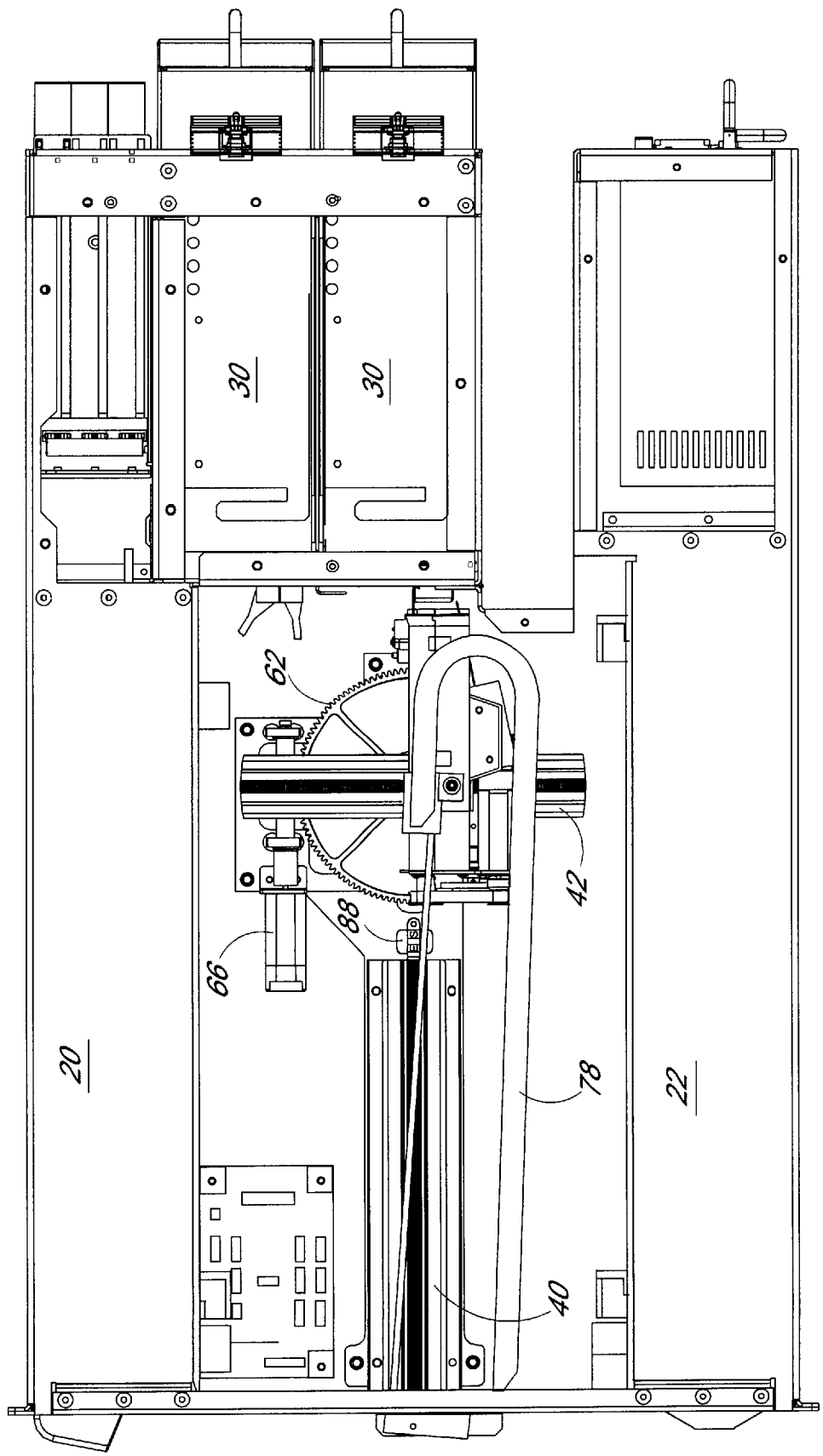
FIG. 6B is a top view of the embodiment of FIG. 4 with the rotatable track segment rotated 90 degrees from its position in FIGS. 4A and 4B, and with the transport carriage positioned to insert a media element into a second media element reader.
Figure 6C:
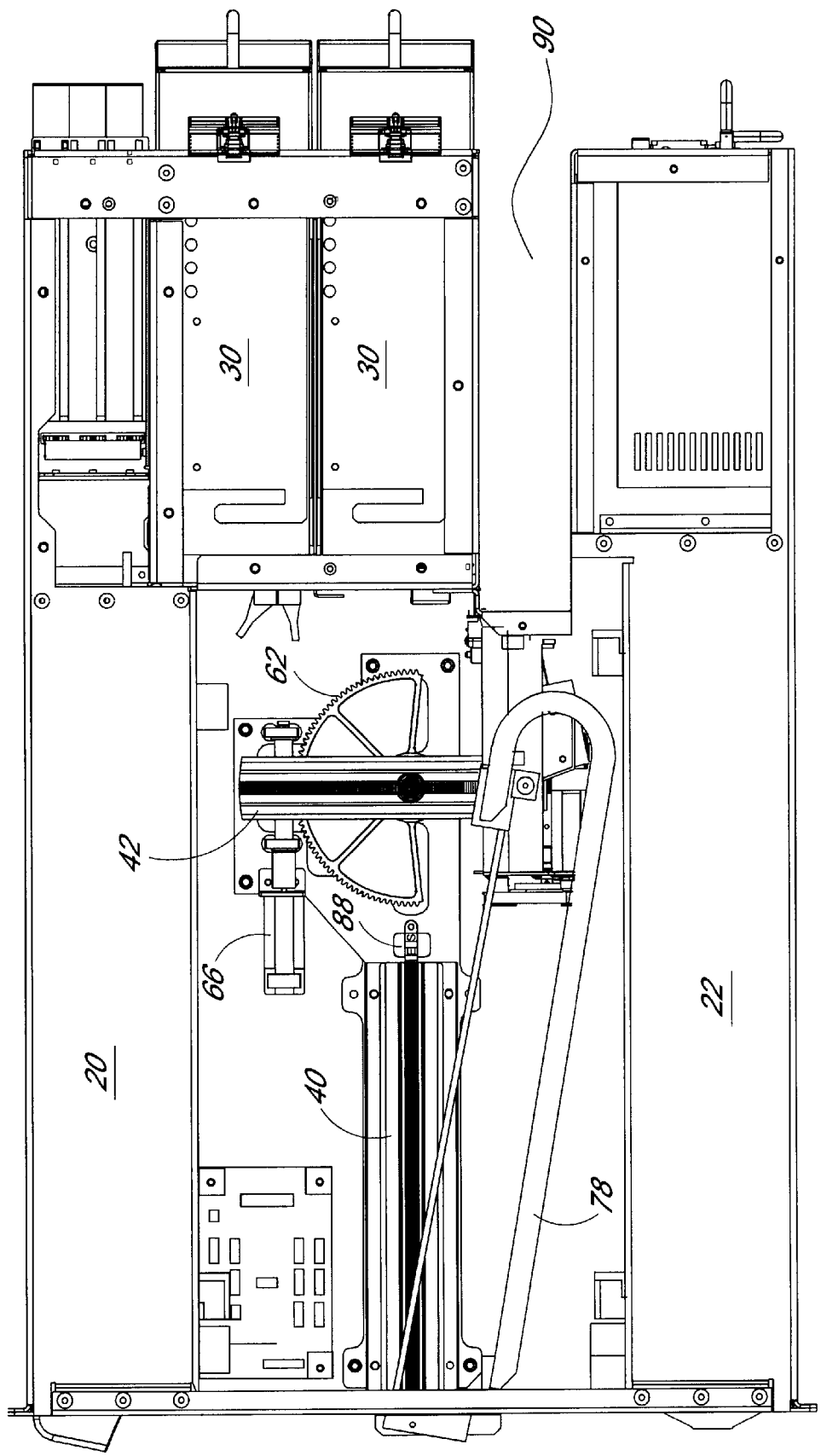
FIG. 6C is a top view of the embodiment of FIG. 4 with the rotatable track segment rotated 90 degrees from its position in FIGS. 4A and 4B, and with the transport carriage positioned to insert a media element into a pass through slot located adjacent to the second media element.

When the rotatable track segment is oriented as shown in FIGS. 6A through 6C, the journaled pivot point 86 where the bracket 82 is attached to the shuttle 32 allows the conduit 78 to swing back and forth in an arc as the shuttle moves along the track segment 42. In addition, when the shuttle 32 is rotated 180 degrees over the axis of rotation 44 of the second track segment 42, the rod 84 prevents the shuttle bracket 82 from rotating along with it, and therefore the bracket 82 remains in the same orientation with respect to the library housing as the body of the shuttle 32 rotates beneath it. This minimizes the stress on the wiring as the shuttle moves and rotates and maintains the wiring in consistent orientations with respect to the shuttle as the shuttle changes position and orientation with respect to the rest of the library.

Although no significant mechanical problems have been seen to arise with respect to the shuttle transition as it moves from the fixed track 40 to the rotatable track 42 when they are in the linearly aligned position, it is advantageous to include a support structure 88 attached to the base plate 60 at the end of the fixed track 40 that the rotatable track can engage when it swings into the aligned position. The support structure may take many alternative forms. It may, for example, include an indentation and engaging spring loaded ball bearing, cammed surfaces, or a combination of these elements. It is preferably machined to a relatively tight tolerance to hold the rotatable track segment 42 in a precise position when the two track 40, 42 are in the aligned orientation.

Referring now to FIG. 6B, this Figure is similar to FIG. 6A, but illustrates the shuttle adjacent to a second tape drive 30. FIG. 6C illustrates the shuttle in a third rightward position, which in this embodiment is a position adjacent to a channel 90 formed in the rear portion of the library enclosure. A slot in the rear panel allows the shuttle 32 to transfer a tape cartridge out of the library enclosure and to a second transfer carriage which moves up and down within the channel 90. This allows automated transfer between separate rack mounted library modules, as is explained in additional detail in the Kersey et al. patent referred to above.

Using the principles described above, a media element library with high volumetric efficiency is created that also has high reliability and is relatively inexpensive to manufacture.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A media library comprising:
   at least one media element magazine comprising a plurality of media element storage locations;
   a media element transfer carriage configured to retrieve media elements from said storage locations; and
   a track supporting said media element transfer carriage, wherein said track comprises at least first and second separate linear segments, and wherein at least one of said segments is rotatable independently of one or more other segments, whereby said transfer carriage is moveable in alternative linear directions depending on the angular orientation of said rotatable segment.

2. The media library of claim 1, wherein said rotatable segment is pivotably coupled to a base of said library at approximately the midpoint of said rotatable segment.

3. The media library of claim 1, wherein said rotatable segment is rotatable so as to be aligned along the front of said at least one media element magazine in a first orientation.

4. The media element library of claim 3, additionally comprising a plurality of linearly aligned media element readers.

5. The media element library of claim 4, wherein said plurality of media element readers are aligned orthogonal to said media element magazine.

6. The media element library of claim 5, wherein said rotatable track segment is rotatable so as to be aligned along the front of said plurality of media element readers in a second orientation.

7. A method of robotically transferring a media element to a media element reader, said method comprising:

positioning a transfer carriage adjacent to a media element storage location;

loading a media element into said transfer carriage;

moving said transfer carriage in a first direction along a linear track until said transfer carriage resides on a rotatable segment of said linear track;

rotating the rotatable segment of said linear track supporting said transfer carriage while maintaining another segment of said linear track substantially stationary; and moving said transfer carriage in a second direction along said rotated segment so as to position said transfer carriage adjacent to a media element reader.

8. The method of claim 7, wherein said transfer carriage is positioned approximately over an axis of rotation of said rotating segment prior to rotating said segment.

9. A robotic media handling system comprising:

at least first and second linear track segments, wherein one of said segments is pivotably mounted on an axis such that said pivotably mounted segment is independently rotatable relative to at least one other segment; and a media element transfer carriage comprising a storage location for at least one media element, wherein said media element transfer carriage is movably mounted to said first or said second track segments.

10. The robotic media handling system of claim 9, wherein said media element transfer carriage is coupled to electrical wiring for signal and power.

11. The robotic media handling system of claim 10, wherein said electrical wiring is routed to said media element transfer carriage within a cable chain.

12. The robotic media handling system of claim 11, wherein said cable chain is pivotably coupled to said media element transfer carriage.

13. The robotic media handling system of claim 12, wherein said cable chain is coupled to a bracket, and wherein said bracket is pivotably mounted to said media element transfer carriage.

14. A robotic media handling system comprising:

first and second linear track segments, wherein one of said segments is pivotably mounted on an axis of rotation;

a media element transfer carriage comprising a storage location for at least one media element, wherein said media element transfer carriage is movably mounted to said first or said second track segments, wherein said media element transfer carriage is coupled to electrical wiring for signal and power, wherein said electrical wiring is routed to said media element transfer carriage within a cable chain, wherein said cable chain is pivotably coupled to said media element transfer carriage, wherein said cable chain is coupled to a bracket, and wherein said bracket is pivotably mounted to said media element transfer carriage; and an alignment bar which extends through a channel in said bracket such that when said media element transfer carriage is rotated, said bracket is substantially prevented from rotating along with said media element transfer carriage.

15. A media library comprising:

at least one media element magazine comprising a plurality of media element storage locations;

a media element transfer carriage configured to retrieve media elements from said storage locations;

a track supporting said media element transfer carriage, wherein said track comprises at least a first and second discontinuous linear segments, and wherein at least one of said segments is independently rotatable around an axis perpendicular to said track, whereby said transfer carriage is moveable in alternative linear directions depending on the angular orientation of said rotatable segment.

16. A media library comprising:

at least one media element magazine comprising a plurality of media element storage locations;

a media element transfer carriage configured to retrieve media elements from said storage locations;

a first linear segment configured to support said media element transfer carriage; and a second rotatable linear segment configured to support said media element transfer carriage and comprising a first and second ends, wherein said first end is adjacent to said first linear segment when said second linear segment is in a first position and said second end is adjacent to said first linear segment when said second linear segment is rotated around an axis to a second position, wherein said axis is perpendicular to said second linear segment, whereby said transfer carriage is moveable in alternative parallel linear directions depending on whether said second linear segment is in the first position or the second position.

\* \* \* \* \*